(12) United States Patent
Choi et al.

(10) Patent No.: US 6,975,483 B2
(45) Date of Patent: Dec. 13, 2005

(54) DISK RECORDING DEVICE FOR MANUFACTURING HARD DISK DRIVES

(75) Inventors: Sang-Jin Choi, Suwon (KR); Tae-Sang Park, Suwon (KR); Sang-Chul Ko, Seoul (KR); Dong-Ok Kwak, Suwon (KR); Ki-Keon Yeom, Suwon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 144 days.

(21) Appl. No.: 10/284,102

(22) Filed: Oct. 31, 2002

(65) Prior Publication Data

US 2004/0001279 A1 Jan. 1, 2004

(30) Foreign Application Priority Data

Jun. 29, 2002 (KR) .......................................... 2002-37603

(51) Int. Cl.[7] .............................................. G11B 33/14
(52) U.S. Cl. .................................................. 360/97.02
(58) Field of Search .......................... 360/97.01, 97.02, 360/31, 39, 77.08, 77.07; 29/603.03; 361/685

(56) References Cited

U.S. PATENT DOCUMENTS

| 6,021,028 A | | 2/2000 | Uwabo et al. .............. 360/133 |
| 6,091,573 A | * | 7/2000 | Pisano et al. ............... 720/630 |
| 2002/0181148 A1 | * | 12/2002 | Dahlenburg et al. ...... 360/97.02 |
| 2004/0036994 A1 | * | 2/2004 | Kainuma et al. ............. 360/31 |
| 2004/0125488 A1 | * | 7/2004 | Zhu et al. ..................... 360/75 |

* cited by examiner

*Primary Examiner*—Julie Anne Watko
(74) *Attorney, Agent, or Firm*—Staas & Halsey LLP

(57) ABSTRACT

A disk recording device to manufacture hard disk drives. This disk recording device includes a spindle to detachably hold a disk of a hard disk drive. A spindle motor rotates the spindle. A recording unit records data on a surface of the disk while moving over the surface of the disk held on the spindle. A disk protecting unit covers the surfaces of the disk to protect the disk from an external environment when the disk is rotated. In the disc recording device, the disk protecting unit approaches or moves away from the disk through a reciprocating motion within a predetermined range.

18 Claims, 4 Drawing Sheets

DISK RECORDING DEVICE FOR MANUFACTURING HARD DISK DRIVES

CROSS-REFERENCE TO RELATED APPLICATIONS

This application claims the benefit of Korean Application No. 2002-37603, filed Sep. 6, 2002, in the Korean Intellectual Property Office, the disclosure of which is incorporated herein by reference.

BACKGROUND OF THE INVENTION

1. Field of the Invention

The present invention relates generally to a disk recording device to manufacture hard disk drives, and more particularly, to a disk recording device to manufacture hard disk drives which is capable of recording data on a disk before it is mounted in a hard disk drive, during a process of manufacturing hard disk drives.

2. Description of the Related art

As well known to those skilled in the art, a hard disk drive is used as a data storage unit of a computer, and includes a thin disk, a head, and an arm. The disk is rotatably installed in a casing of the computer and stores data. The head writes data onto the disk or reads the data while moving over the surface of the disk. The head is movably supported by the arm.

When the manufacture of the hard disk drive is just completed, data cannot be recorded on the surface of the disk, so the hard disk drive is usually formatted so that it may store data. That is, tracks are compactly formed on the disk and the disk is divided into sectors so that the disk may store data. Such a formatting process is usually performed after the assembly of the hard disk drive is finished during a process of manufacturing the hard disk drive.

However, the method of manufacturing the conventional hard disk drives has a problem in that a formatting process is performed after the assembly of the hard disk drive is completed, so it forces manufacturers to spend a lot of time to perform the formatting process as the data storage capacity of the hard disk drive becomes larger, thus reducing productivity of hard disk drives and being difficult to meet a market demand.

Further, the conventional method of manufacturing the conventional hard disk drives has another problem in that a hard disk drive production line becomes enlarged due to an unexpected large volume of the hard disk drives when arranging the assembled hard disk drives for a formatting process, thus requiring a large working space.

SUMMARY OF THE INVENTION

Accordingly, it is an aspect of the present invention to provide a disk recording device to manufacture hard disk drives, which is capable of recording data on a disk before it is mounted in a hard disk drive at a process of manufacturing hard disk drives, thus increasing productivity of the hard disk drives, and thus reducing the working space for a hard disk drive production line.

Additional aspects and advantages of the invention will be set forth in part in the description which follows and, in part, will be obvious from the description, or may be learned by practice of the invention.

The foregoing and other aspects of the present invention are achieved by providing a disk recording device to manufacture hard disk drives, comprising: a spindle to detachably hold a disk of a hard disk drive; a spindle motor rotating the spindle; a recording unit recording data on a surface of the disk while moving over the surface of the disk held by the spindle, and a disk protecting unit covering the external surface of the disk to protect the disk from the external environment when the disk is rotated, the disk protecting unit approaching or moving away from the disk through a reciprocating motion within a predetermined range.

The recording unit comprises: a support shaft mounted at a position spaced apart from the spindle in such a way as to be parallel to an axis of the spindle; an arm rotatably installed at the support shaft and extending toward the spindle to approach the surface of the disk; an arm drive motor driving the arm, and a recording head mounted at a free end of the arm.

The spindle comprises: a ring-shaped spacing member mounted to the external surface of the spindle at a position between neighboring disks such that two or more disks are installed on the spindle while being spaced apart from each other; and a fastening member engaging with a threaded part formed on the external surface of the spindle and fastening the disks. A plurality of arms are mounted to the support shaft to record data on the disks.

The disk protecting unit comprises a protective cover covering both surfaces of the disk while approaching the disk, a guiding unit to guide a reciprocating motion of the protective cover, and a drive unit to move the protective cover in such a way that the protective cover approaches or moves away from the disk.

The protective cover comprises: two side plates spaced apart from each other and having a fan shape to partially cover both surfaces of the disk; a connecting part connecting the two side plates to each other along outer circumferences of the side plates in such a way as to close a gap between the side plates, and an opening formed in the protective cover in a reciprocating direction of the cover such that the cover receives the disk in the opening.

The protective cover further comprises at least one partition plate. In this case, the partition plate is interposed between the two side plates to separate two or more disks from each other when the disks are installed on the spindle at the same time.

The guiding unit comprises a guide rail longitudinally installed in a reciprocating direction of the protective cover, a moving member slidably mounted to the guide rail and connected to the protective cover; and at least one detecting unit provided on a moving path of the moving member to detect a position of the moving member.

The detecting unit comprises a detected part extending from the moving member by a predetermined length, and a sensor detecting a position of the detected part, while the sensor comprises a photo-coupler having a light emitting part and a light receiving part arranged to be spaced apart from each other, and detecting whether the detected part enters between the light emitting and receiving parts or not.

Further, the drive unit comprises a cover moving motor mounted to the protective cover, a pinion gear mounted to a rotating shaft of the cover moving motor, and a rack gear installed along a reciprocating direction of the protective cover and engaging with the pinion gear.

BRIEF DESCRIPTION OF THE DRAWINGS

These and other aspects and advantages of the invention will become apparent and more readily appreciated from the following description of the embodiments, taken in conjunction with the accompanying drawings of which.

DESCRIPTION OF THE PREFERRED EMBODIMENTS

Figure 1:
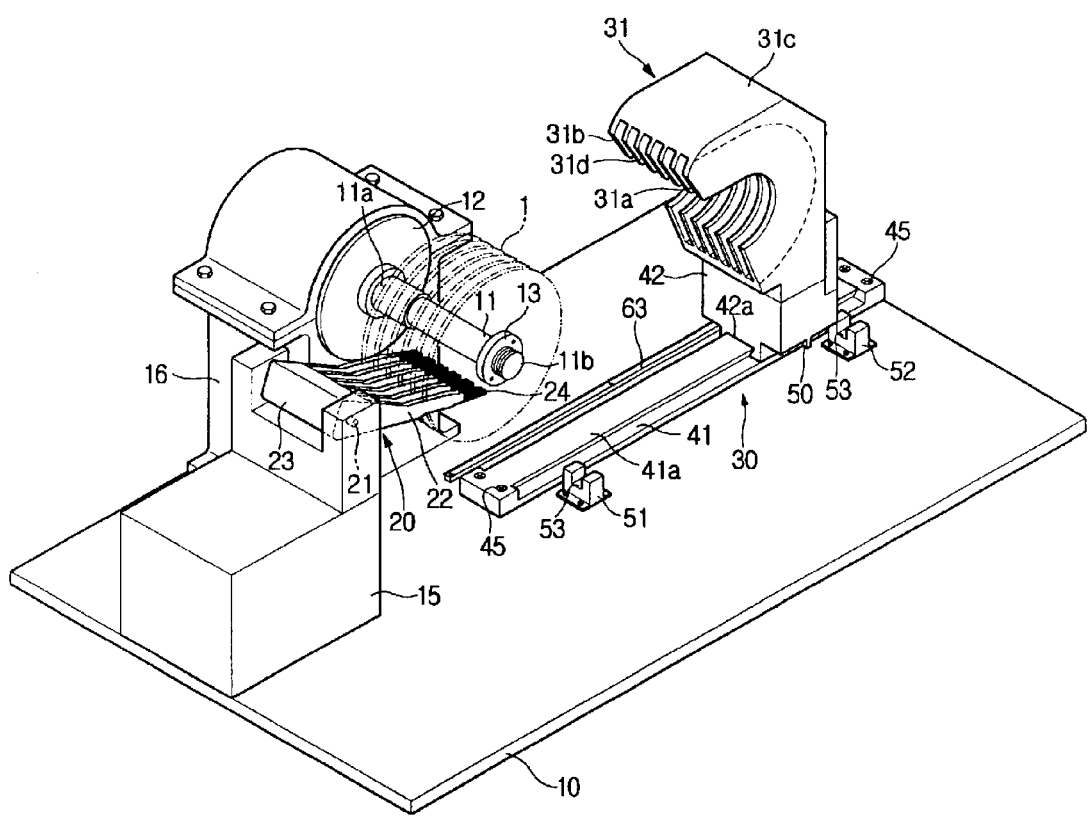
FIG. 1 is a perspective view illustrating a disk recording device to manufacture hard disk drives according to an embodiment of this invention.

Reference will now be made in detail to the embodiments of the present invention, examples of which are illustrated in the accompanying drawings, wherein like reference numerals refer to like elements throughout. The embodiments are described below in order to explain the present invention by referring to the figures.

Reference should now be made to the drawings, in which the same reference numerals are used throughout the different drawings to designate the same or similar components.

A disk recording device to manufacture hard disk drives according to this invention is applied to a production line to manufacture hard disk drives, and performs a disk formatting process beforehand, prior to assembling the hard disk drives.

As illustrated in the FIGS. 1 to 4, the recording device to manufacture hard disk drives of this invention includes a spindle 11 on which two or more disks 1 are simultaneously installed. A spindle motor 12 rotates the spindle 11. A data recording unit 20 performs a formatting process, that is, forms tracks and sectors onto each disk 1 installed on the spindle 11. The disk recording device also has a disk protecting unit 30. The disk protecting unit 30 protects the disk 1 rotating at a high speed while recording data from the flow of air surrounding the disk 1, thus minimizing recording errors.

The spindle motor 12 is installed at a position which is spaced apart from the upper surface of a base plate 10, through a motor support member 16 set at the upper surface of the flat base plate 10. At this time, the spindle 11 is set in such a way as to be parallel to the base plate 10. Such a construction allows two or more disks 1 to be installed on the external surface of the spindle 11 which extends from the spindle motor 12 to a predetermined position. The spindle 11 is designed to have a larger outer diameter at a portion coming into contact with the spindle motor 12, to form a step 11a. The disk 1 is locked to and supported by the step 11a when the disk 1 is installed on the spindle 11 from the end of the spindle 11. An external threaded part 11b is formed on the external surface of the end portion of the spindle 11, and engages with a fastening member 13, such as a nut, so as to fasten the disk 1 installed on the spindle 11. When two or more disks 1 are simultaneously installed on the external surface of the spindle 11, ring-shaped spacing members 14 are installed on the spindle 11 to separate the disks 1 from each other. Such a construction allows two or more disks 1 installed on the spindle 11 to be separated from each other at regular intervals, by the spacing members 14. The fastening member 13 is tightened to the end portion of the spindle 11, thus allowing the disks 1 to be fastened to the spindle 11 and rotated along with the spindle 11 at a high speed.

The data recording unit 20 records data on the disk 1 installed on the spindle 11, and is provided at a position which is spaced apart from the spindle 11 by a predetermined interval. Such a data recording unit 20 includes a support shaft 21 which is installed in parallel to the axis of the spindle 11. An arm 22 is rotatably installed at the support shaft 21 and extends toward the spindle 11 to approach the surface of the disk 1. The data recording unit 20 also has an arm drive motor 23 rotating the arm 22. A recording head 24 is mounted at the free end of the arm 22.

In such a case, the support shaft 21 is horizontally installed on a block 15 which is fixed to the base plate 10. The arm 22 mounted to the support shaft 21, the recording head 24 mounted at the end of the arm 22, and the arm drive motor 23 are the same or similar to those of a conventional hard disk drive. But, in the hard disk drive of this invention, the number of arms 22 or the heads 24 is twice the number of the disks 1 which are installed on the spindle 11. For example, as illustrated in the drawings, when the number of the disks 1 installed on the spindle 11 is six, the number of the arms 22 or the heads 24 is twelve, because two arms 22 and two heads 24 are required for one disk 1.

The disk protecting unit 30 is provided with a fan-shaped protective cover 31, and a guiding unit to guide the reciprocation motion of the protective cover 31. The protecting unit 30 is also provided with a drive unit to be described in more detail later. The drive unit moves the protective cover 31 such that it approaches or moves away from the disk 1 installed on the spindle 11.

Figure 2:
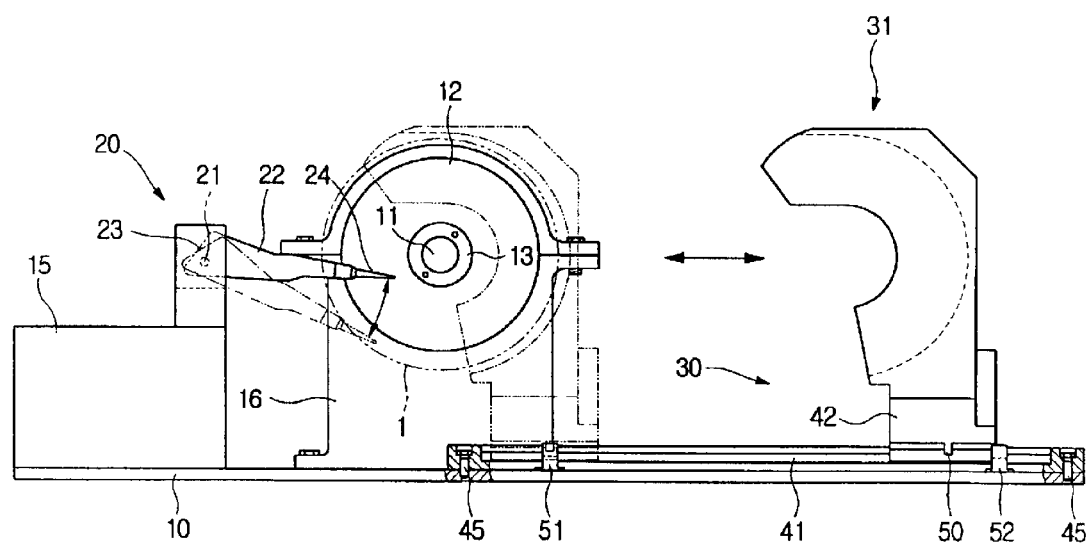
FIG. 2 is a front view of the disk recording device according to FIG. 1.

As illustrated in the FIGS. 1 and 2, the protective cover 31 includes two side plates 31a and 31b, and a connecting part 31c. The two side plates 31a and 31b have a fan-shape capable of covering half or more of the surface areas of both surfaces of the disk 1, and are spaced apart from each other while being positioned in parallel to each other. The connecting part 31c connects the two side plates 31a and 31b to each other while extending along the outer circumferences of the side plates 31a and 31b in such a way as to dose a gap between the two side plates 31a and 31b. In this case, the two side plates 31a and 31b cover the surfaces of the first and last disks 1 of several disks 1 installed on the spindle 11, respectively. An opening is formed by the gap of the protective cover 31 in its reciprocating direction such that the cover 31 receives the disks 1 in the opening.

A partition plate 31d is interposed in parallel with and between the two side plates 31a and 31b of the protective cover 31 to separate two or more disks 1 installed on the spindle 11 from each other when the cover 31 covers the disks 1 in the opening. The partition plate 31d also has a fan-shape, and is connected to the connecting part 31c at its outer circumference.

The protective cover 31 protects the disk 1 rotating at a high speed from the flow of air surrounding the disk 1. That is, the protective cover 31 protects the disk 1 from air surrounding the disk 1, thus preventing the disk 1 from being shaken due to the flow of air, therefore minimizing the recording error.

The guiding unit to guide the reciprocating motion of the protective cover 31 includes a guide rail 41, a moving member 42, and a detecting unit (described in detail later). The guide rail 41 longitudinally extends in a reciprocating direction of the protective cover 31, and is installed on the base plate 10. The moving member 42 is slidably mounted on the guide rail 41. The detecting unit is provided on the moving path of the moving member 42 to detect its position.

The guide rail 41 extends in such a way as to be perpendicular to the spindle 11, and is screwed to the base plate 10 by setscrews 45 which are provided at both ends of the guide rail 41. As illustrated in the FIG. 4, the moving member 42 is provided on its lower surface with a longitudinal mortise groove 42a. The mortise groove 42a slidably engages with a longitudinal dovetail tenon rail 41a which is formed on the upper surface of the guide rail 41 along the axis of the rail 41. The lower end of the protective cover 31 is fixed to the upper portion of the moving member 42. Such a construction allows the protective cover 31 to reciprocate together with the moving member 42 when the moving member 42 is moved along the guide rail 41. Furthermore, the above construction allows the protective cover 31 to cover the external surfaces of the disks 1 or move away therefrom, through the reciprocating motion of the protective cover 31.

The detecting unit detects a position of the moving member 42, and includes a detected part 50, a first sensor 51, and a second sensor 52. The detected part 50 is provided on the moving member 42 to be projected from the lower end of the member 42. The first and second sensors 51 and 52 are installed on the base plate 10 at positions around both ends of the guide rail 41, respectively, so as to detect the position of the movable detected part 50. The two sensors 51 and 52 thus detect a position of the moving member 42, when the protective cover 31 covers the disk 1 or completely moves away from the disk 1, so as to control the movement of the protective cover 31 in response to the detected information.

The two sensors 51 and 52 each comprise a common photo-coupler including a light emitting part and a light receiving part arranged to be spaced apart from each other, and detects whether the detected part 50 moves between the light emitting and receiving parts or not. The light emitting and receiving parts are arranged to be opposite to each other with respect to a detected recess 53 of each sensor 51 or 52, although they are not shown in the drawings in detail. When the detected part 50 extending from the moving member 42 enters the detected recess 53, it blocks the light, thus allowing a user to be informed of the position of the moving member 42.

Figure 3:
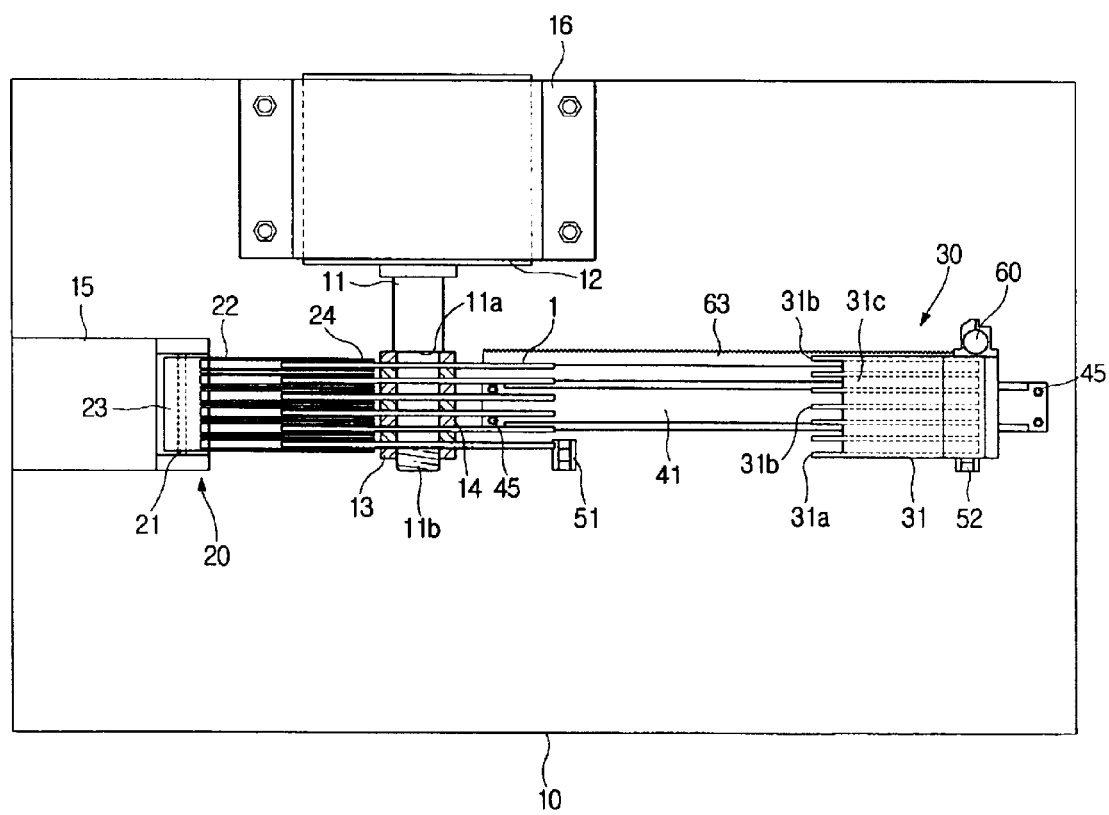
FIG. 3 is a plan view of the disk recording device according to FIG. 1.
Figure 4:
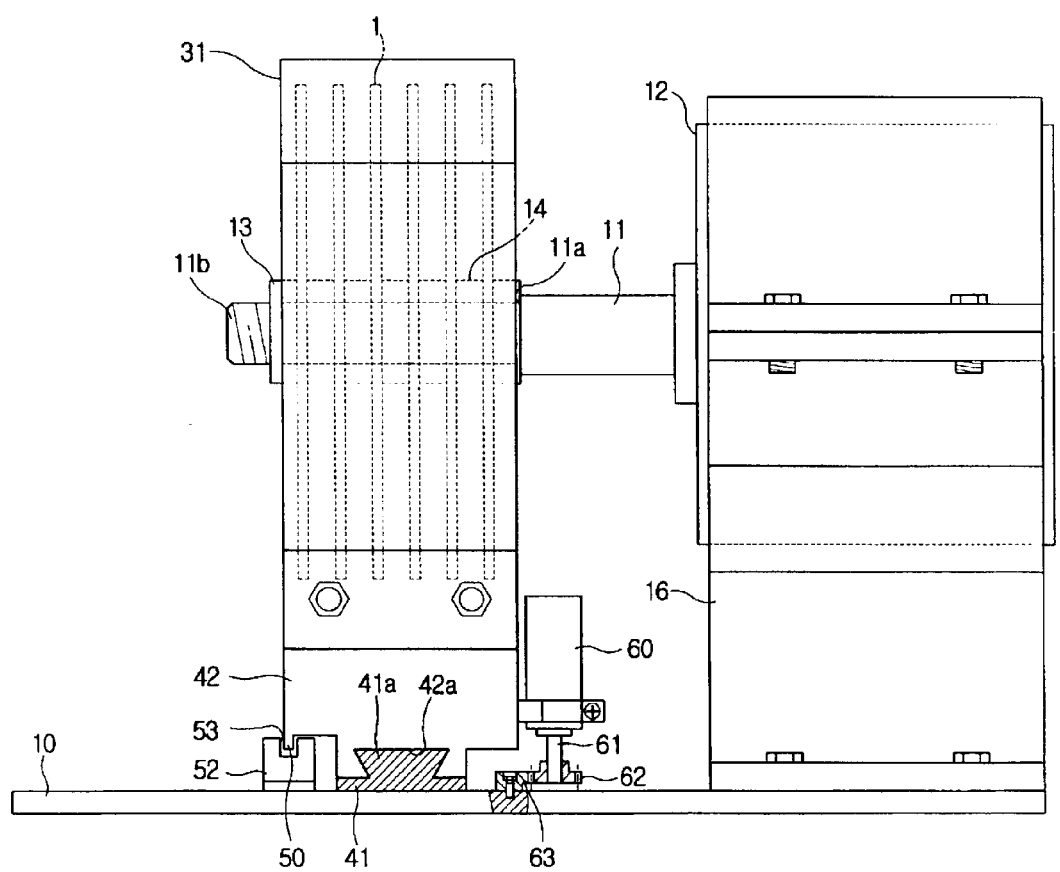
FIG. 4 is a side view of the disk recording device according to FIG. 1.

As illustrated in the FIGS. 3 and 4, the drive unit moving the protective cover 31 includes a cover moving motor 60, a pinion gear 62, and a rack gear 63. The cover moving motor 60 is mounted to a surface of the moving member 42. The pinion gear 62 is mounted to a rotating shaft 61 of the cover moving motor 60. The rack gear 63 is installed along the guide rail 41 and engages with the pinion gear 62. In this case, the length of the rack gear 63 is almost equal to that of the guide rail 41. The rack gear 63 is mounted to the base plate 10 while being arranged in parallel to the guide rail 41.

According to this embodiment, the moving member 42 and the protective cover 31 are separately produced and are assembled with each other before the cover moving motor 60 is mounted to the moving member 42. But, the moving member 42 may be integrated with the protective cover 31 to form a single structure. Furthermore, the cover moving motor 60 may be mounted to a surface of the protective cover 31, in place of the surface of the moving member 42.

The operation and use of the recording device to manufacture hard disk drives according to this invention will be described hereinafter.

In order to perform a formatting process which forms tracks and sectors on the produced disk 1, one or more disks 1 are first installed on the spindle 11. At this time, the disks 1 are separated from each other by a predetermined interval by the spacing members 14 installed on the external surface of the spindle 11. Next, the fastening member 13 is tightened to the end portion of the spindle 11 so as to fasten the disks 1 to the spindle 11 without preventing an undesired movement of the disks 1 on the spindle 11.

After finishing the installation of the disks 1 on the spindle 11, the cover moving motor 60 is operated so that the protective cover 31 moves toward the disks 1 to cover the external surfaces of the disks 1. That is, when the cover moving motor 60 is driven, the pinion gear 62 engaging with the rack gear 63 is rotated, so the protective cover 31 moves toward the disks 1 to cover the external surfaces of the disks 1. When the protective cover 31 covers the external surfaces of the disks 1, the position of the detected part 50 extending from the moving member 42 is detected by the first sensor 51. When the value of the detected position of the member 42 reaches a preset value, the cover moving motor 60 stops operating.

At the above-mentioned position of the moving member 42, the protective cover 31 covers the external surfaces of the disks 1, with the two side plates 31a and 31b of the protective cover 31 spaced apart from the disks 1 at a predetermined interval. The partition plates 31d are interposed between the side plates 31a and 31b, and are put between the neighboring disks 1 to separate the disks 1 from each other.

After the protective cover 31 covers the disks 1, the spindle 11 is rotated at a high speed by the spindle motor 12, so the disks 1 are also rotated at the same speed. At the same time, the recording heads 24 are moved over the surfaces of the disks 1 through the reciprocating motion of the arms 22 which are included in the recording unit 20, and record data on the disks 1. That is, the formatting process is performed.

In this case, the disks 1 are rotated at a high speed as they are covered by the protective cover 31, thus protecting the disks 1 from the flow of air surrounding the disks 1 due to their high-speed rotation, therefore allowing the disks 1 to be stably rotated, in addition to ensuring the accurate recording of data. That is, the disks 1 are covered with the protective cover 31, so air resistance to the disks 1 is minimized, thus preventing the disks 1 from being shaken, therefore minimizing the recording errors.

When the formatting of the disks 1 is completed, the spindle motor 12 stops operating and simultaneously the recording of data using the heads 24 is stopped. At this time, the cover moving motor 60 is rotated in a reverse direction, so the protective cover 31 is also moved in a reverse direction to move away from the disks 1. When the protective cover 31 completely moves away from the disks 1, the position of the detected part 50 of the moving member 42 is detected by the second sensor 52, so the cover moving motor 60 stops operating. Thereafter, a user loosens the fastening member 13 from the spindle 11 and separates the disks 1 from the disk recording device.

As described above, the present invention provides a disk recording device to manufacture hard disk drives, which is capable of simultaneously recording data on two or more disks prior to assembling a hard disk drive, thus rapidly producing the hard disk drives.

In addition, according to this invention, data recording operations are performed prior to assembling a hard disk drive, so an additional disk formatting process is not required after finishing the assembling of the hard disk drive, thus reducing the amount of equipment required to manufacture the hard disk drives.

Further, a protective cover provided in this invention protects a disk, rotating at a high speed while recording data, from air surrounding the disk, thus preventing the disk from being shaken, therefore minimizing the error in recording data.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A disk recording device to manufacture hard disk drives, comprising:
    a spindle to detachably hold a disk of a hard disk drive;
    a spindle motor rotating the spindle;
    a recording unit to record data on a surface of the disk while moving over the surface of the disk held by the spindle; and
    a disk protecting unit to cover an external surface of the disk to protect the disk from an external environment when the disk is rotated, said disk protecting unit approaching or moving away from the disk through a reciprocating motion within a predetermined range,
    wherein said disk protecting unit comprises:
    a protective cover covering both surfaces of the disk while approaching the disk;
    guiding unit to guide a reciprocating motion of the protective cover; and
    a drive unit to move the protective cover in such a way that the protective cover approaches or moves away from the disk.

2. The disk recording device according to claim 1, wherein said recording unit comprises:
    a support shaft mounted at a position spaced apart from the spindle in such a way as to be parallel to an axis of the spindle;
    an arm rotatably installed at the support shaft and extending toward the spindle to approach the surface of the disk;
    an arm drive motor driving the arm; and
    a recording head mounted at a free end of the arm.

3. The disk recording device according to claim 2, wherein said spindle comprises:
    a ring-shaped spacing member mounted to an external surface of the spindle at a position between neighboring disks such that two or more disks are installed on the spindle while being spaced apart from each other; and
    a fastening member engaging with a threaded part formed on the external surface of the spindle and fastening the disks, wherein
    the disk recording device further comprises a plurality of arms mounted to the support shaft to record data on the disks.

4. The disk recording device according to claim 3, wherein the spindle has a larger outer diameter at a portion coming in contact with the spindle motor, to form a step.

5. The disk recording device according to claim 3, wherein for each of the plurality of disks there are two arms, of the plurality of arms.

6. The disk recording device according to claim 1, wherein said protective cover comprises:
    two side plates spaced apart from each other and having a fan shape to partially cover both surfaces of the disk;
    a connecting part connecting the two side plates to each other along outer circumferences of the side plates to close a gap between the side plates; and
    an opening formed in the protective cover in a reciprocating direction of said cover such that the cover receives the disk in the opening.

7. The disk recording device according to claim 6, wherein said protective cover further comprises at least one partition plate, said partition plate being in parallel with and interposed between the two side plates to separate two or more disks from each other when the disks are installed on the spindle at the same time.

8. The disk recording device according to claim 1, wherein said guiding unit comprises:
    a guide rail longitudinally installed in a reciprocating direction of the protective cover;
    a moving member slidably mounted on the guide rail and connected to the protective cover; and
    at least one detecting unit provided on a moving path of the moving member to detect a position of said moving member.

9. The disk recording device according to claim 8, wherein said detecting unit comprises:
    a detected part extending from the moving member by a predetermined length; and
    a sensor detecting a position of the detected part.

10. The disk recording device according to claim 9, wherein said sensor comprises a photo-coupler including a light emitting part and a light receiving part arranged to be spaced apart from each other, and detecting whether said detected part moves between the light emitting and receiving parts or not.

11. The disk recording device according to claim 10, wherein one of the light emitting part and the light receiving part is positioned at one of the ends of the guide rail while the other of the light emitting part and the light receiving part is positioned at the other end of the guide rail to detect the position of the movable detected part.

12. The disk recording device according to claim 8, wherein the guide rail extends perpendicular to the spindle.

13. The disk recording device according to claim 8, wherein the moving member is provided on its lower surface with a longitudinal mortise groove.

14. The disk recording device according to claim 13, wherein the guide rail is provided with a longitudinal dovetail tenon rail on its upper surface along the axis thereof such that the mortise groove slidably engages with the longitudinal dovetail tenon rail.

15. The disk recording device according to claim 1, wherein said drive unit comprises:
    a cover moving motor provided on the protective cover;
    a pinion gear mounted to a rotating shaft of the cover moving motor; and
    a rack gear installed along a reciprocating direction of the protective cover and engaging with the pinion gear.

16. The disk recording device according to claim 15, wherein the moving member and the protective cover are separately produced and assembled with each other before the cover moving motor is mounted to the moving member.

17. The disk recording device according to claim 15, wherein a moving member and the protective cover are integrally formed as a single structure.

18. The disk recording device according to claim 15, wherein the cover moving motor is mounted to a surface of the protective cover.

* * * * *

UNITED STATES PATENT AND TRADEMARK OFFICE
CERTIFICATE OF CORRECTION

PATENT NO. : 6,975,483 B2  
DATED : December 13, 2005  
INVENTOR(S) : Sang-jin Choi It is certified that error appears in the above-identified patent and that said Letters Patent is hereby corrected as shown below:

<u>Title page,</u>
Item [57], ABSTRACT,
Line 8, replace "disc" with -- disk --.

Signed and Sealed this

Twenty-third Day of May, 2006

JON W. DUDAS
*Director of the United States Patent and Trademark Office*